(12) United States Patent
Liu (10) Patent No.: US 6,312,003 B1
(45) Date of Patent: Nov. 6, 2001

(54) COMPLEX TRAILER FOR A VEHICLE

(75) Inventor: Yun-Chun Liu, Hsinchu (TW)

(73) Assignees: Yu-Ling Peng; Chiu-Hsiang Peng; Jui-Chu Liao; Mei-Yuan Huang; Jui-Chun Chan; Wen-Hua Huang, all of Hsinchu (TW)

( * ) Notice: Subject to any disclaimer, the term of this patent is extended or adjusted under 35 U.S.C. 154(b) by 0 days.

(21) Appl. No.: 09/473,161

(22) Filed: Dec. 28, 1999

(30) Foreign Application Priority Data

Jun. 15, 1999 (CN) .................................................. 88209821

(51) Int. Cl.$^7$ .................................................... B62D 63/06
(52) U.S. Cl. ........................ 280/411.1; 280/410; 280/204
(58) Field of Search ................................. 280/411.1, 204, 280/412, 408, 410, 292

(56) References Cited

U.S. PATENT DOCUMENTS

| | | | |
|---|---|---|---|
| 2,306,231 | * | 12/1942 | Smith et al. . |
| 2,750,206 | * | 6/1956 | Sabato . |
| 4,057,283 | * | 11/1977 | Barnett ................................ 296/23 C |
| 4,415,174 | * | 11/1983 | Koehn .................................. 280/411 |
| 4,577,881 | * | 3/1986 | Gerber ................................. 280/412 |
| 4,756,541 | * | 7/1988 | Albitre ................................. 280/204 |
| 5,785,334 | * | 7/1998 | Robinson ............................ 280/204 |

* cited by examiner

*Primary Examiner*—Paul N. Dickson
*Assistant Examiner*—Avraham H. Lerner (57) ABSTRACT

The complex trailer can be coupled to a vehicle having a drawing rack and mainly comprises a first trailer and a second trailer, in which the first trailer includes a deck, a bogie wheel, and a landing; the second trailer includes a wagon bed, and a trailing wheel. The complex trailer also has three coupling devices for respectively coupling the drawing rack and the first trailer, and the first trailer and the second trailer. Moreover, the trailing wheels can take the place of the landing wheels and the wagon bed can be combined with and thereby carried by the first trailer in case the first trailer and the second trailer are combined together so as to save space and to provide stable travel.

5 Claims, 7 Drawing Sheets

COMPLEX TRAILER FOR A VEHICLE

BACKGROUND OF THIS INVENTION

1. Field of the Invention

This invention relates to a carrier for hauling articles, and in particular, to a complex trailer adapted to be drawn by a vehicle and having two compartments allowing for individual or combined use.

2. Related Art of the Invention

For an outdoor car wash, supplies such as water, electric power, a large water tank, a generator, an air compressor, a vacuum cleaner, and various tools and materials are necessary, and a mid-sized car can be used to carry such supplies. However, for a narrow street or a crowded area, such a car is inconvenient due to its size. Moreover, in case such supplies are gathered in one car, parts of supplies will be difficult to be shifted to a different location and thus its utility is relatively low. On the other hand, if parts of such items are separately carried by different smaller vehicles, a number of vehicles are necessary and a larger waste of energy as well as a greater occupation of space will occur. This invention is thus submitted to overcome the above problem.

SUMMARY OF THIS INVENTION

A primary object of this invention is to provide a complex trailer which can be drawn by a vehicle and is easy to be combined and separated.

Another object of this invention is to provide a movable carrier suitable to be drawn by a vehicle and travel a narrow street with a heavy load.

The other object of this invention is to provide a carrier which is fuel-efficient, easily portable and suitable for long distance transportation with a vehicle or for a short distance pushed by hand.

Yet another object of this invention is to provide a carrier which has a large compartment and a well-engineered design.

To achieve the above objects, a complex trailer adapted to be drawn by a vehicle having a drawing rack comprises a first trailer including a deck having a front end and a rear end, a beveled bucket mounted on the deck, at least one bogie wheel mounted on the front end of the deck, and a rear movable landing means mounted under the deck adjacent to the rear end thereof, the landing means having at least two landing wheels such that the first trailer is substantially supported by the bogie wheel and the landing wheels; a second trailer including a wagon bed which has two opposite sides, an upper end and a lower end, and a trailing wheel means which is mounted on one of the sides of the wagon bed and has two trailing wheels and at least one axle rod supporting the two trailing wheels; a first coupling means for releasably coupling the drawing rack and the first trailer; a second coupling means for releasably coupling the first trailer and the trailing wheel means in case the rear end of the deck is supported by the trailing wheels instead of the landing wheels; and a third coupling means for releasably coupling the upper end of the wagon bed and the first trailer.

By means of the above structure, each trailer of this invention provides a large loading space owing to the absence of an engine in each trailer. Moreover, the first trailer can provide a large loading capacity and the second trailer can effect a save of labor and time. During a pause in moving, the wagon bed of the second trailer could be unloaded from the first trailer and thus reduce the load of the first trailer.

The other objects, functions, and effects of this invention will be apparent by means of the following detailed description. However, the detailed description and its concrete embodiments are directed to a preferred embodiment; various modifications and variants in the spirit and scope of this invention being apparent to persons skilled in the art, and thus it would be merely an example for description.

DESCRIPTION OF THE PREFERRED EMBODIMENT

In the following, a concrete embodiment of the complex trailer according to this invention is described with reference to the drawings.

Figure 1:
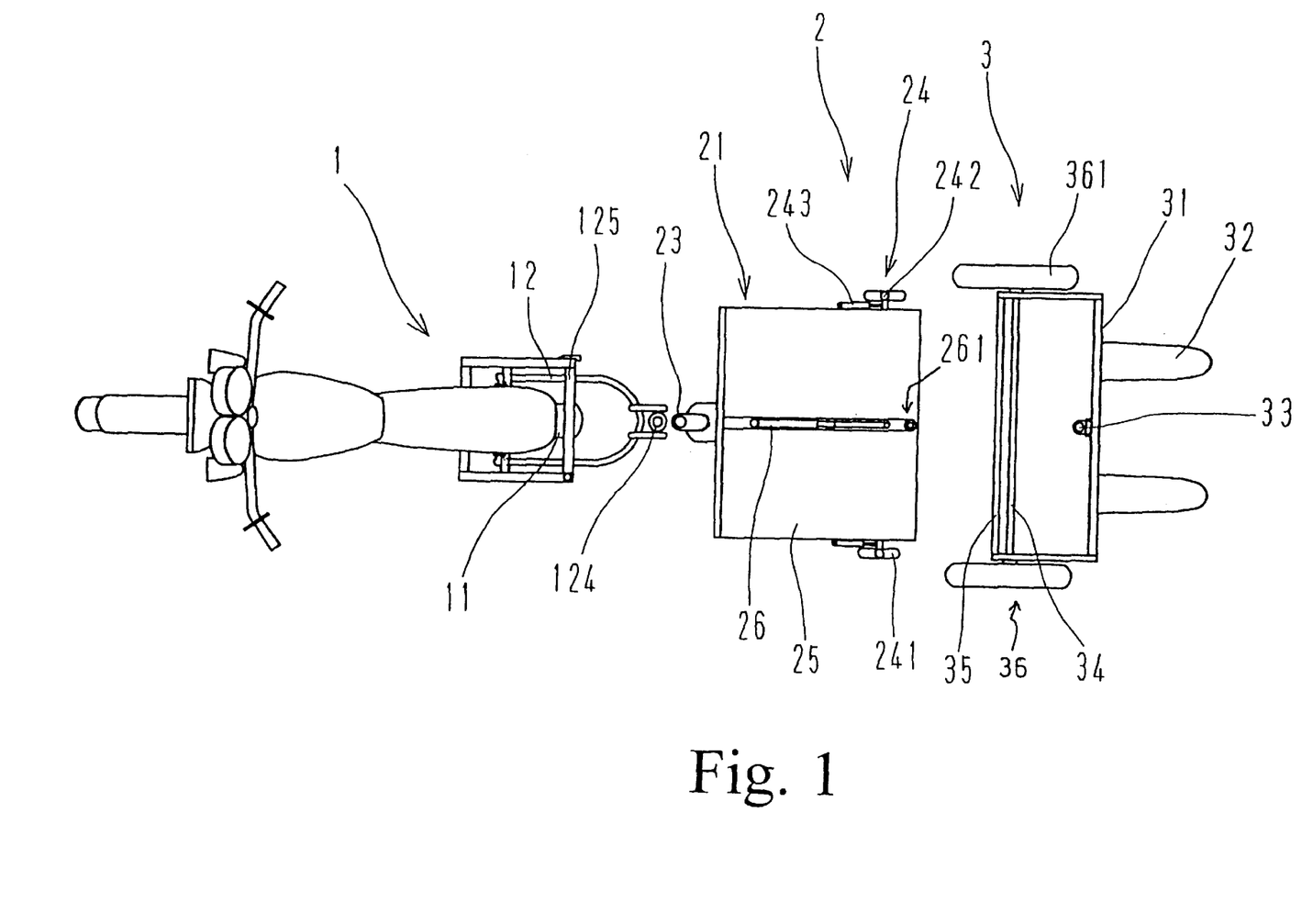
FIG. 1 is a top view of the complex trailer according to this invention in which each main part is separated.
Figure 2:
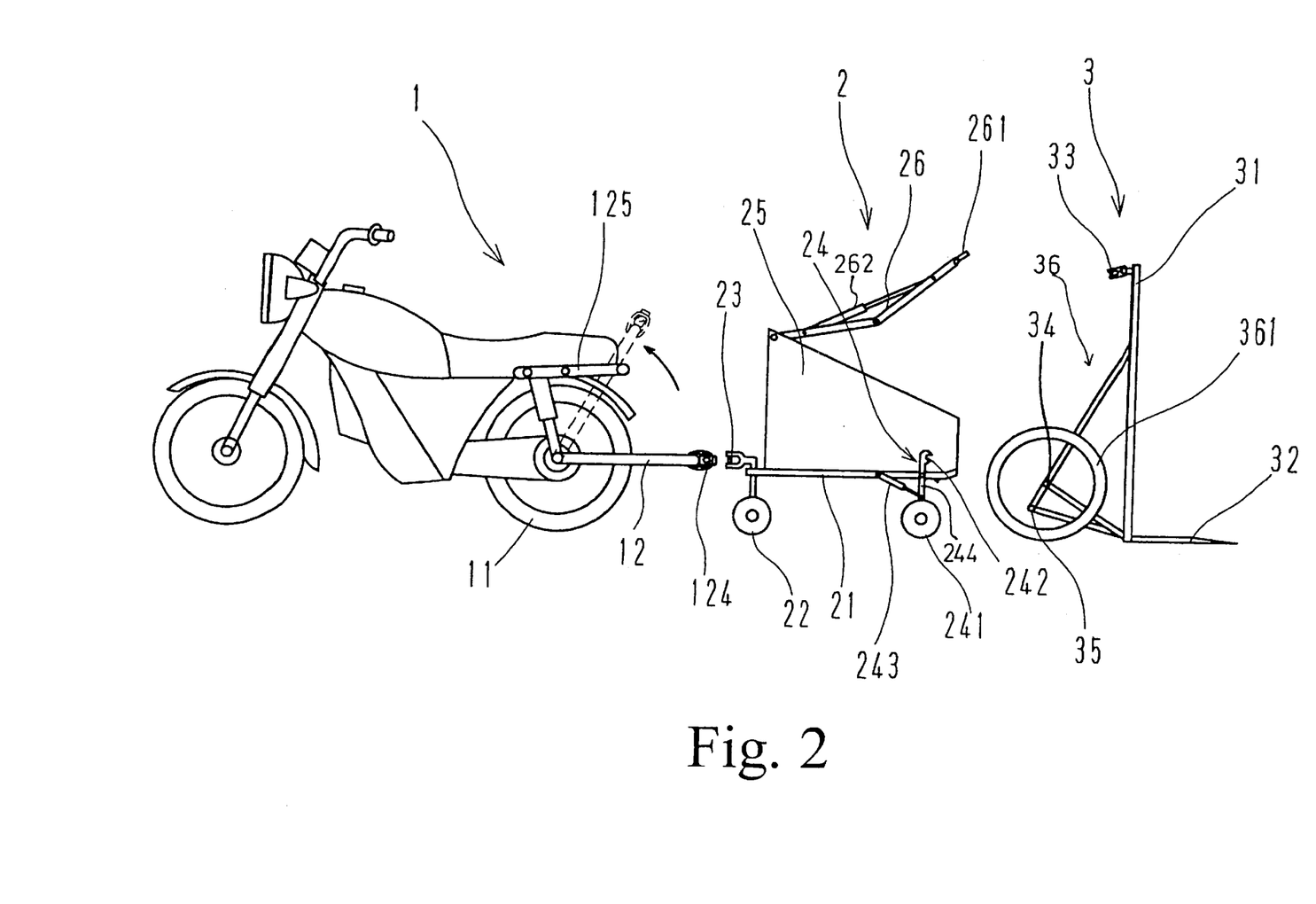
FIG. 2 is a side view of the complex trailer according to this invention in which each main part is separated.

As shown in FIGS. 1 and 2, the complex trailer according to this invention mainly comprises a first trailer 2 and a second trailer 3, and is especially suitable to be used with a motorcycle 1, which is provided with a drawing rack 12 for drawing either the first trailer 2 or the second trailer 3. Moreover, there is provided a first coupling means for coupling the drawing rack 12 and the first trailer 2, a second coupling means for coupling, at one location, the first trailer 2 and the second trailer 3, and a third coupling means for coupling, at another location, the second trailer 3 and the first trailer 2, as well as a toggle linkage 26 disposed between the first trailer 2 and the third coupling means. Each of these coupling means consists of a male and a female joint respectively located where the two parts are to be coupled. In detail, the first coupling means includes a collar 124, serving as a female joint, provided in the drawing rack 12, and a kingpin 23, serving as a male joint, provided in the first trailer 2. The second coupling means includes a hook 242, serving as a female joint, provided in the first trailer 2, and an axle rod 34, serving as a male joint, provided in the second trailer 3. The third coupling means includes a collar 261, serving as a female joint, provided at one free end of the toggle arm 26, and a kingpin 33, serving as a male joint, provided in the second trailer 3.

The first trailer 2 mainly comprises a deck 21 having a front end and a rear end, a beveled bucket 25 mounted above the deck 21, a bogie wheel 22 mounted under the front end of the deck 21, and a rear landing means 24 mounted under the rear end of the deck 21. The kingpin 23, serving as a male joint of the first coupling means, is provided above the bogie wheel 22 and combined therewith. However, as a variant it can also be provided on an upper portion of the beveled bucket 25. The rear landing means 24 comprises a pair of supporting legs 244 centrally pivoted onto two sides of the deck 21, a pair of landing wheels 241 mounted at one end of the supporting legs 244, and a pair of retractable braces 243 mounted between the deck 21 and one end of the supporting legs 244. Moreover, there is a hook 242, serving as a female joint of the second coupling means, provided at the other end of each supporting leg 244. The retractable brace 243 in this embodiment is constructed by a stay damper. However, it can also be constructed by a hinge type strut consisting of two arm sections. Furthermore, the rear end of the deck 21 is shaped as a dovetail for allowing the smooth insertion of an axle rod 34 of the second trailer 3 into a position to be coupled.

The second trailer 3 includes a wagon bed 31, a trailing wheel means 36 mounted on one side of the wagon bed 31, and two inserting blades 32 perpendicularly extending on the other side of the wagon bed 31. The trailing wheel means 36 includes a pair of wheels 361, an axle rod 34 supporting the two wheels 361, and a pushing rod 35 parallel to the axle rod 34 for pushing the supporting legs 244 into an off-landing status in case the second trailer 3 is coupled to the first trailer 2. Moreover, when the second trailer 3 is not coupled to the first trailer 2, it can stand alone by means of a lower end of the wagon bed 31 and the two trailing wheels 361.

The toggle arm 26 has a fixed end mounted on the upper portion of the beveled bucket 25, and a free end incorporated with a collar 261, serving as a female joint of the third coupling means, for pulling and positioning an upper end of the wagon bed 31 of the second trailer 3 to a position of being supported by the beveled bucket 25 of the first trailer 2. As a variant, the toggle arm 26 can be actuated by a hydraulic cylinder 262 in cooperation with a hydraulic mechanism (not shown).

Figure 5:
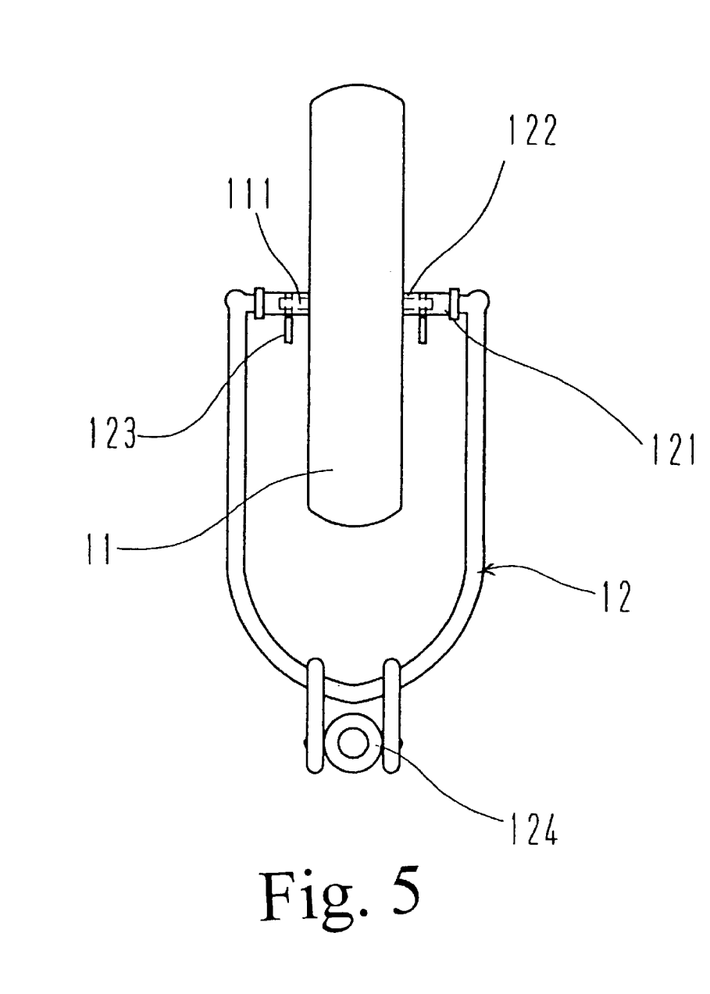
FIG. 5 is a top view showing the assembled status of the cycle and the drawing rack.

As shown in FIG. 5, the drawing rack 12 is U-shaped and is provided with a collar 124 at its returning end for coupling with the kingpin 23 provided on the first trailer 2 or the kingpin 33 provided on the second trailer 3. The opening ends of the U-shaped rack 12 are provided with telescopic sockets 121 to be mounted onto the rear axle 111 of a rear wheel 11 of the motorcycle 1. The telescopic socket 121 is mounted onto the axle 111 via a hollow joint 122 provided with female threads thereinside. A pin 123 is provided for penetrating the axle and the joint 122 so as to lock the coupling between the rear axle 111 and the drawing rack 12. However, the drawing rack 12 can also be fixed in another part of the motorcycle 1 in a variant.

Figure 3:
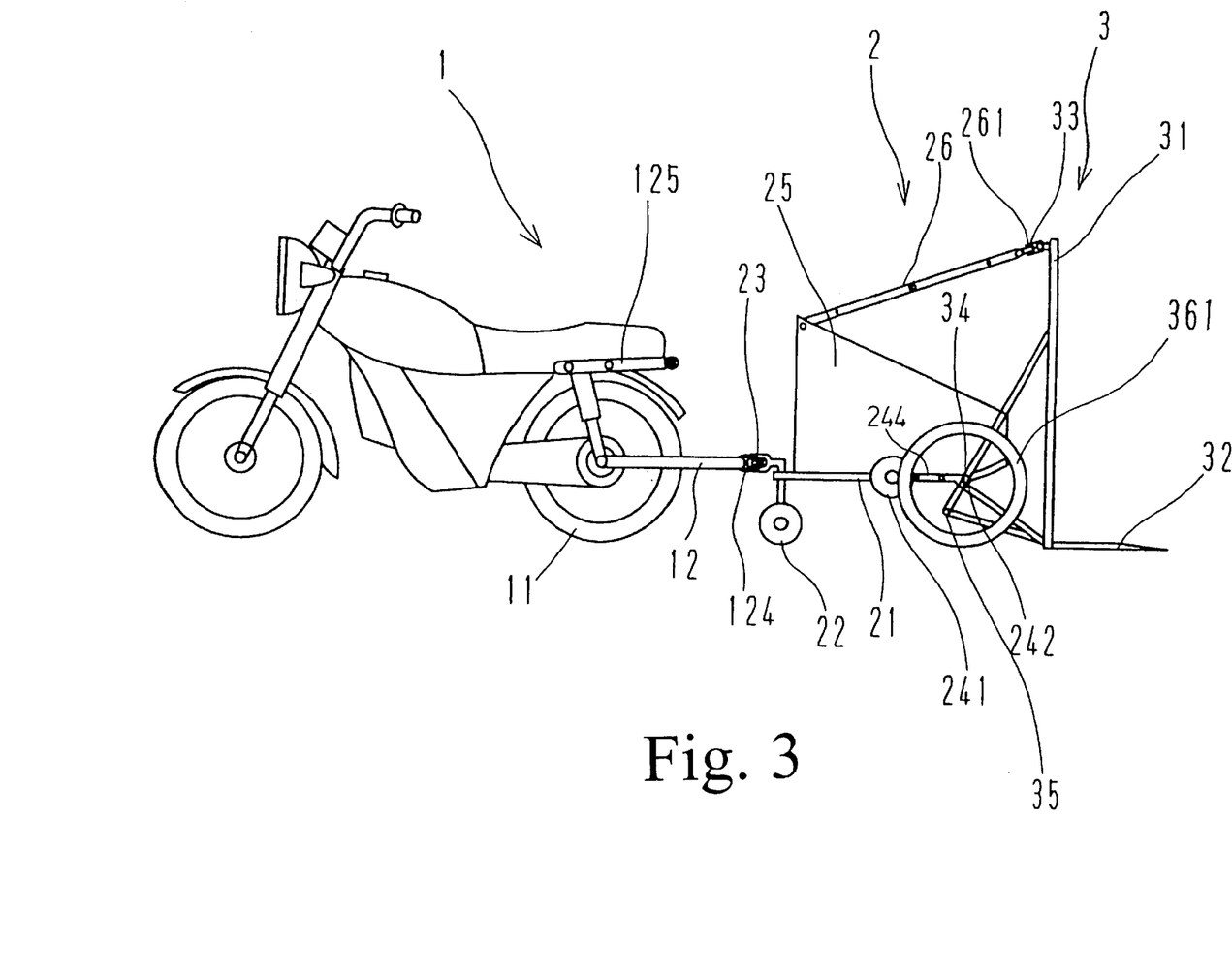
FIG. 3 is a side view of the complex trailer according to this invention in which the first trailer and the second trailer are primarily coupled together.
Figure 4:
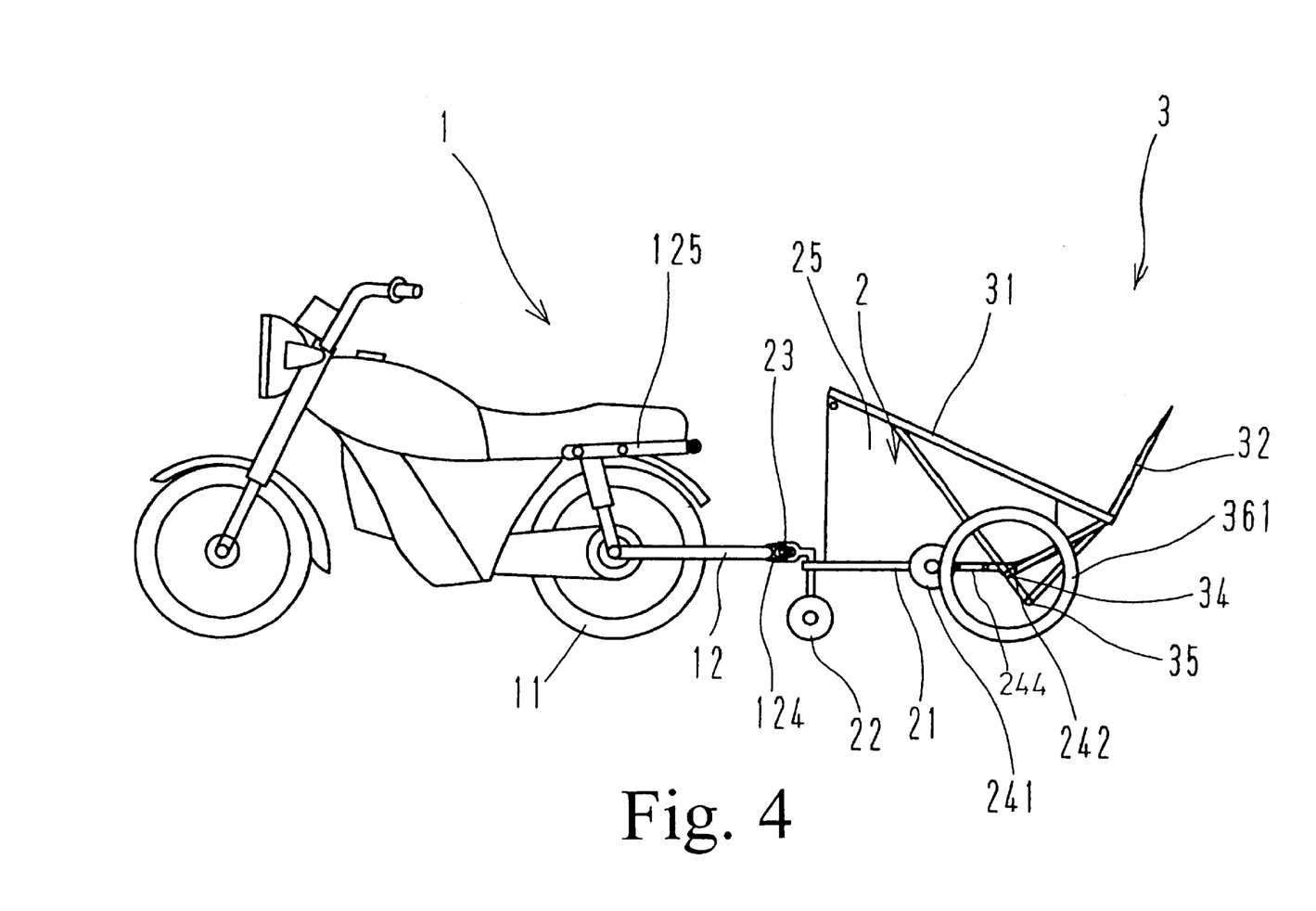
FIG. 4 is a side view of the complex trailer according to this invention in which the first trailer and the second trailer are completely coupled together.

FIGS. 3 and 4 shows an assembly with respect to the first and the second trailers 2 and 3. As shown in FIG. 3, initially, in case the second trailer 3 is to be assembled to the first trailer 2, it is pushed toward the rear portion of the first trailer 2 and the axle rod 34 slides under the deck 21. In line with the arrival of the axle rod 34 at a position to be coupled by the hook 242, the pushing rod 35 will push the supporting legs 244 to elevate the landing wheels 241 from the ground and the deck 21 will be supported by the trailing wheels 361 instead of the landing wheels 241. Once the landing wheels 241 are rotated up to the deck 21, the hooks 242 will lock the axle rod 34. On the other hand, the toggle arm 26 could extend so as to make the collar 261 couple with the kingpin 33 provided on the second trailer 3.

As shown in FIG. 4, secondly, the toggle arm 26 could be bent thoroughly so as to pull and rotate the wagon bed 31 to a location above the opening of the beveled bucket 25. In such a case, the complex trailer of this invention is very compact and thus very suitable to be drawn along a narrow street. Besides, the toggle arm 26 can be slightly bent in as much as the lower end of the wagon bed 31 is off-landing. In such a case, an angle locking means may be necessary for the toggle arm 26. However, if the collar 261, i.e., the female joint of the third coupling means, is mounted on the bucket 25, such a locking means is unnecessary.

Figure 6:
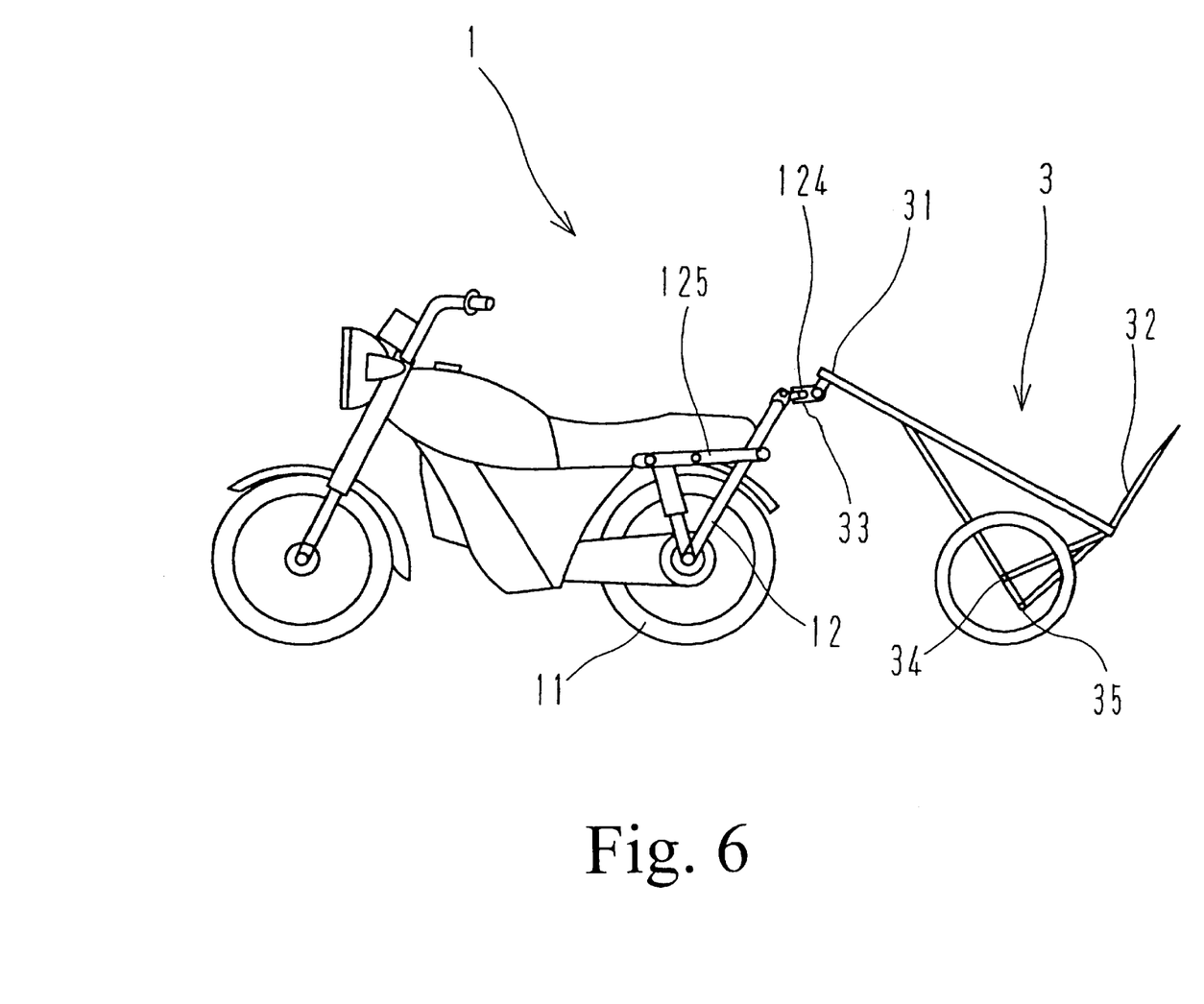
FIG. 6 is a side view showing another assembly style of the cycle and the complex trailer of this invention.

FIG. 6 shows another assembly of the complex trailer of this invention, in which the second trailer 3 is directly coupled with the drawing rack 12. That is, the collar 124, serving as a female joint of the first coupling means, couples with the kingpin 33 of the second trailer 3, serving as a male joint of the third coupling means. However, in such a case, as shown in FIG. 1, a bracket 125 fixed on the cycle 1 should be further provided for supporting the drawing rack 12 to be positioned in an upward inclined direction.

Figure 7:
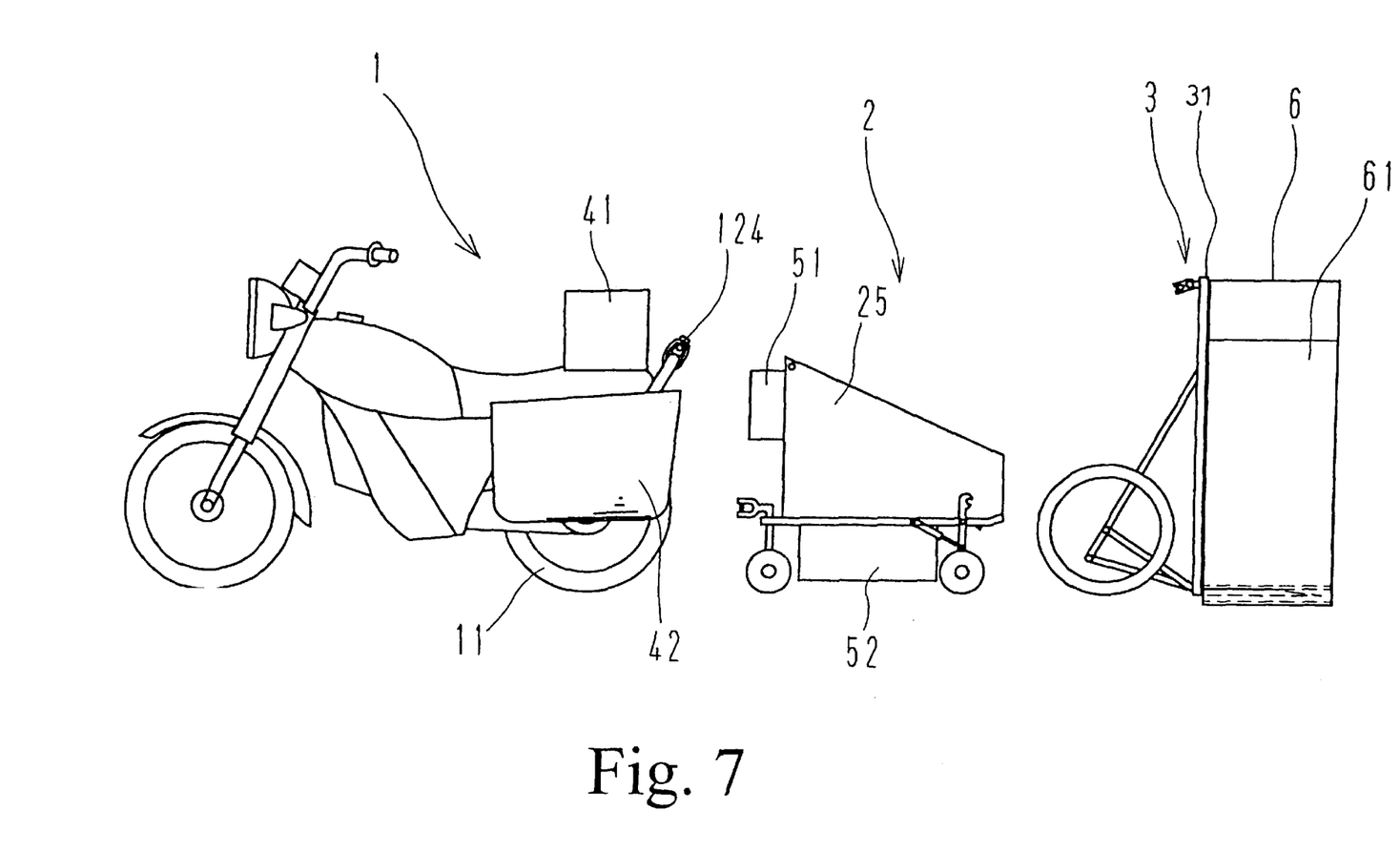
FIG. 7 is a side view showing an application of the complex trailer of this invention to carry necessities for car-washing.

FIG. 7 shows an application of this invention to carry necessities for washing a car. For example, cleaning devices such as a vacuum cleaner 41 and a tool box 42 can be carried by the cycle 1. A wax polish device (not shown) can be accommodated in the beveled bucket 25. A generator or air compressor can also be accommodated in the beveled bucket 25. A fuel tank 51 and bag storage 52 can be hung on the outside of the bucket 25. A washing machine 6 can be carried by the second trailer 3, which may include a water tank 61. Thus, for long distance transportation, the complex trailer could be drawn by a cycle while for short distance transportation, each trailer could be separately and manually pushed to a job site. The efficiency of working is therefor upgraded.

However, the applied scope suitable for this invention is very wide, such as pesticide spraying on a fruit ranch or cropland, a fire extinguisher on a narrow street, or for road cleaning, etc.

Various uses of this invention are possible. For example, the female joint of the second coupling means could be located on the rear side wall of the bucket 25. Such variants do not exceed the spirit and scope of this invention. Thus, all the variants and modifications obvious to persons in the art should be included in the appended claims.

What is claimed is:

1. A complex trailer adapted to be drawn by a vehicle having a drawing rack, comprises:

a first trailer including a deck having a front end and a rear end, a beveled bucket mounted on the deck, at least one bogie wheel mounted on the front end of the deck, and a rear movable landing means mounted under the deck adjacent to the rear end thereof, the landing means having at least two landing wheels such that the first trailer is substantially supported by the bogie wheel and the landing wheels;

a second trailer including a wagon bed which has two opposite sides, an upper end and a lower end, and a trailing wheel means which is mounted on one of the sides of the wagon bed and has two trailing wheels and at least one axle rod supporting the two trailing wheels;

a first coupling means for releasably coupling the first trailer to the drawing rack;

a second coupling means for releasably coupling the first trailer and the trailing wheel means in case the rear end of the deck is supported by the trailing wheels instead of the landing wheels; and a third coupling means for releasably coupling the upper end of the wagon bed and the first trailer.

2. The complex trailer of claim 1, wherein the landing means further includes:

a pair of supporting legs pivotally mounted on opposite sides of the deck, each of the supporting legs having two ends with one end thereof to support one of the landing wheels and the other end thereof formed with a hook to define the second coupling means; and a pair of retractable braces connecting the supporting legs and the deck for retractably holding the supporting legs.

3. The complex trailer of claim 1, wherein the second trailer further includes at least one inserting blade perpendicularly extending outward from the lower end of the wagon bed in a direction opposite to the side on which the trailing wheel means is mounted.

4. The complex trailer of claim 1, further comprises a retractable toggle arm having a free end and a fixed end mounted on the first trailer, and wherein the third coupling means includes a third male joint and a third female joint respectively disposed at the free end of the toggle arm and the wagon bed, such that the upper end of the wagon bed is adapted to be pulled and positioned to be supported by the beveled bucket.

5. The complex trailer of claim 2, wherein the trailing wheel means further includes a pushing rod parallel with the axle rod for pushing the supporting legs toward a coupling position at which the axle rod is coupled by the hook.

* * * * *